T. AND S. PYBOURNE.
HAND TOOL.
APPLICATION FILED JAN. 31, 1922.

1,433,566.

Patented Oct. 31, 1922.

INVENTORS:
Thomas Pybourne
Sydney Pybourne
By Wm Wallace White
ATTY.

Patented Oct. 31, 1922.

1,433,566

UNITED STATES PATENT OFFICE.

THOMAS PYBOURNE AND SYDNEY PYBOURNE, OF WOLSINGHAM, ENGLAND.

HAND TOOL.

Application filed January 31, 1922. Serial No. 533,112.

*To all whom it may concern:*

Be it known that we, THOMAS PYBOURNE and SYDNEY PYBOURNE, subjects of the King of Great Britain and Ireland, residing at Angate Street, Wolsingham, in the county of Durham, England, have invented new and useful Improvements in Hand Tools, of which the following is a specification.

This invention relates to picks, mattocks, hammers, axes, rakes and other hand tools, and has for its object to provide improved means for fixing the tool on a handle.

According to our invention we bind the hand tool to its handle by means of a pair of crossed links, each of which passes diagonally around the handle and over one end and under the other end of the tool. Instead of providing a double-ended hand tool such as a pick or hammer with a central eye to receive the end of the handle as customary, we prefer to make the two ends of the tool separate members each end having cheeks forming portions of the handle-receiving eye and partially embracing the handle which is disposed between the two ends of the tool, said ends being bound to the handle by crossed links. Where the invention is applied to a single-ended tool, such as an axe, adze, rake or hoe, one portion of the hande-receiving eye will be provided on a dummy member instead of an end portion as in a pick. The two ends of the tool may be similar or different, for example one end of a pick and one end of a hammer may be fixed on opposite sides of the same handle, or one end of a hammer and an axe, or a rake and a hoe.

Figure 1:
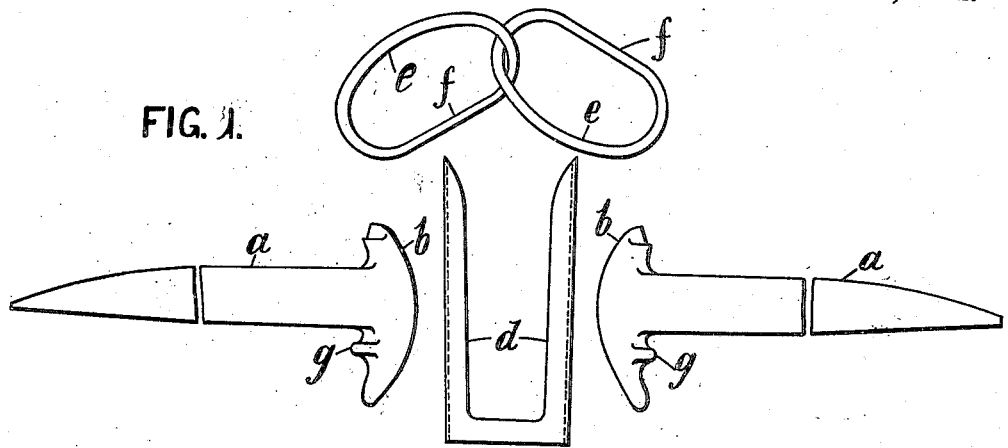
Figure 2:
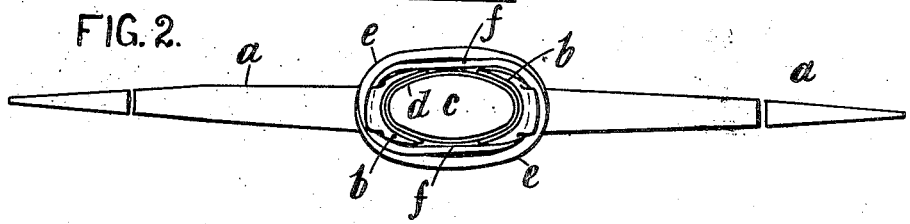
Figure 3:
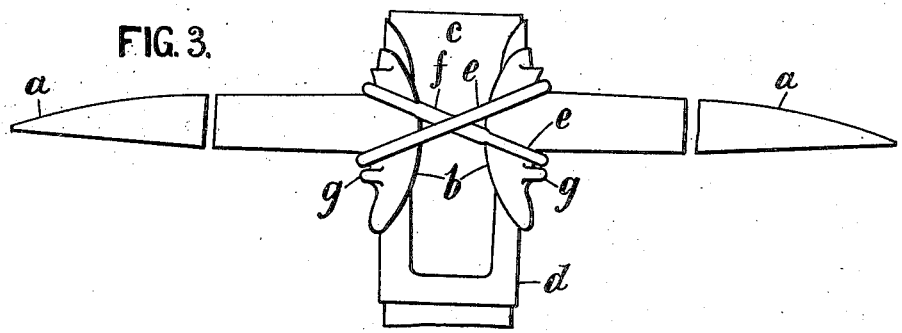
Figure 4:
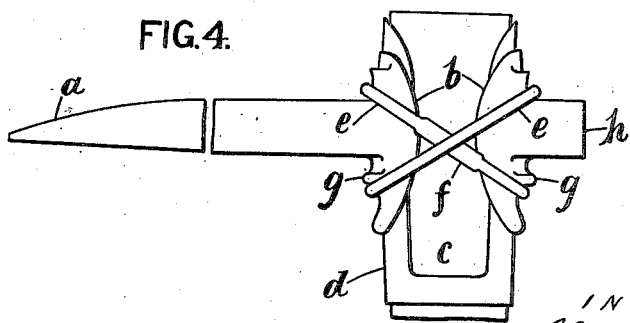

The accompanying drawings illustrate the application thereof to a miner's pick. In the drawings, Figure 1 is an elevation showing the parts separated, Figure 2 is a plan and Figure 3 an elevation showing the parts assembled, and Figure 4 is a similar view to Fig. 3 illustrating a modification.

Referring to the drawings, in the construction therein illustrated, the two ends of the pick $a$, $a$ are made separate and each end is formed with a pair of side cheeks $b$, $b$ shaped to embrace the side of the handle $c$, said cheeks forming a portion of the usual handle-receiving eye. The handle $c$ is preferably strengthened as usual with a socket $d$ which embraces same. We prefer that the socket $d$ shall be of the shape shown. The two ends of the pick are secured to the handle by a pair of loose oval cross links $e$, $e$ each of which may be made out of a piece of round wrought iron bar bent to shape and its ends welded together. Preferably one side of each link will be flattened as shown at $f$. The links $e$, $e$ may be separate, but preferably they will be linked together as shown.

In use, the two links $e$, $e$ are disposed so that they cross, the flattened portion of each link being on the inside, and their ends are separated sufficiently to allow the cheeks $b$, $b$ of the pick ends to be inserted between the adjacent ends of the crossed links. The separate ends of the links are then moved together to engage the pick ends where they flare outwards to form the cheeks, and the handle of the pick is inserted through the crossed links between the cheeks $b$, $b$ of the two pick ends and hammered home, when the crossed links securely bind the pick ends to the handle, each link engaging the outside of the upper portion of the cheek of one pick end and the outside of the lower portion of the cheek of the other pick end, as shown in Figs. 2 and 3. If desired the pick ends may be of cast steel.

To adapt the pick ends to suit handles of varying sizes, we provide on the outside of the lower portion of the cheeks of each pick end a projection $g$. This construction permits of the crossed links $e$, $e$ being arranged to suit three different sizes of handles, viz:—(1) where both links engage the cheeks between the projections $g$, $g$ and the underside of the pick ends as shown in Figure 3, (2) where one link engages the cheek of one pick end between its projection $g$ and the underside of the pick end and the other link engages below the projection $g$ of the cheek of the other pick end, and (3) where both links engage below the projections $g$ of the cheeks of both pick ends as shown in Fig. 4.

If desired, instead of using two pick ends $a$, $a$ as shown in Figs. 1 to 3, we may employ a single pick end $a$ and substitute for the other pick end a dummy end $h$ as shown in Fig. 4, which construction is very useful when working in a confined space.

It will be found that, although the parts are held together solely by the co-action of the crossed links $e$, $e$, these form a very secure fastening and prevent any relative movement between the pick ends $a$, $a$ and the handle $c$. Moreover the construction is light, and permits of either pick end being discarded when worn or broken, and a new one substituted.

What we claim and desire to secure by Letters Patent is:—

1. A hand tool comprising in combination, a pair of separate end members each provided with a flange, a handle disposed between said end members, and a pair of crossed links engaging said flanges each of which links passes diagonally around the handle and over one end and under the other end of said end members.

2. A hand tool comprising in combination, a single end member, a dummy end member, flanges on said members, a handle for said tool disposed between the flanges of said members, a pair of crossed links engaging said flanges and each of which passes diagonally around the handle, one link passing over the end member and under the dummy member and the other link passing over the dummy member and under the end member.

3. A hand tool comprising in combination, a pair of members each having a flange at one end thereof, a handle disposed between the flanges of said members, a socket member adapted to receive said handle, links passing diagonally around the handle and over one end and under the other end of said flanged members, and means on said flanges permitting the flanged members to be adjusted so as to permit the tool to receive handles of varying sizes.

4. A hand tool comprising in combination, a pair of members each having a flange at one end thereof, a handle disposed between the flanges of said members, a socket member adapted to receive said handle, links passing diagonally around the handle and over one end and under the other end of said flanged members, and projections on said flanges for holding said links, said projections permitting the flange members to be adjusted so as to receive handles of varying sizes.

In testimony whereof we have signed our names to this specification.

THOMAS PYBOURNE.
SYDNEY PYBOURNE.